Oct. 2, 1945.    W. M. GAMBILL    2,386,105
FISH LURE
Filed May 27, 1943
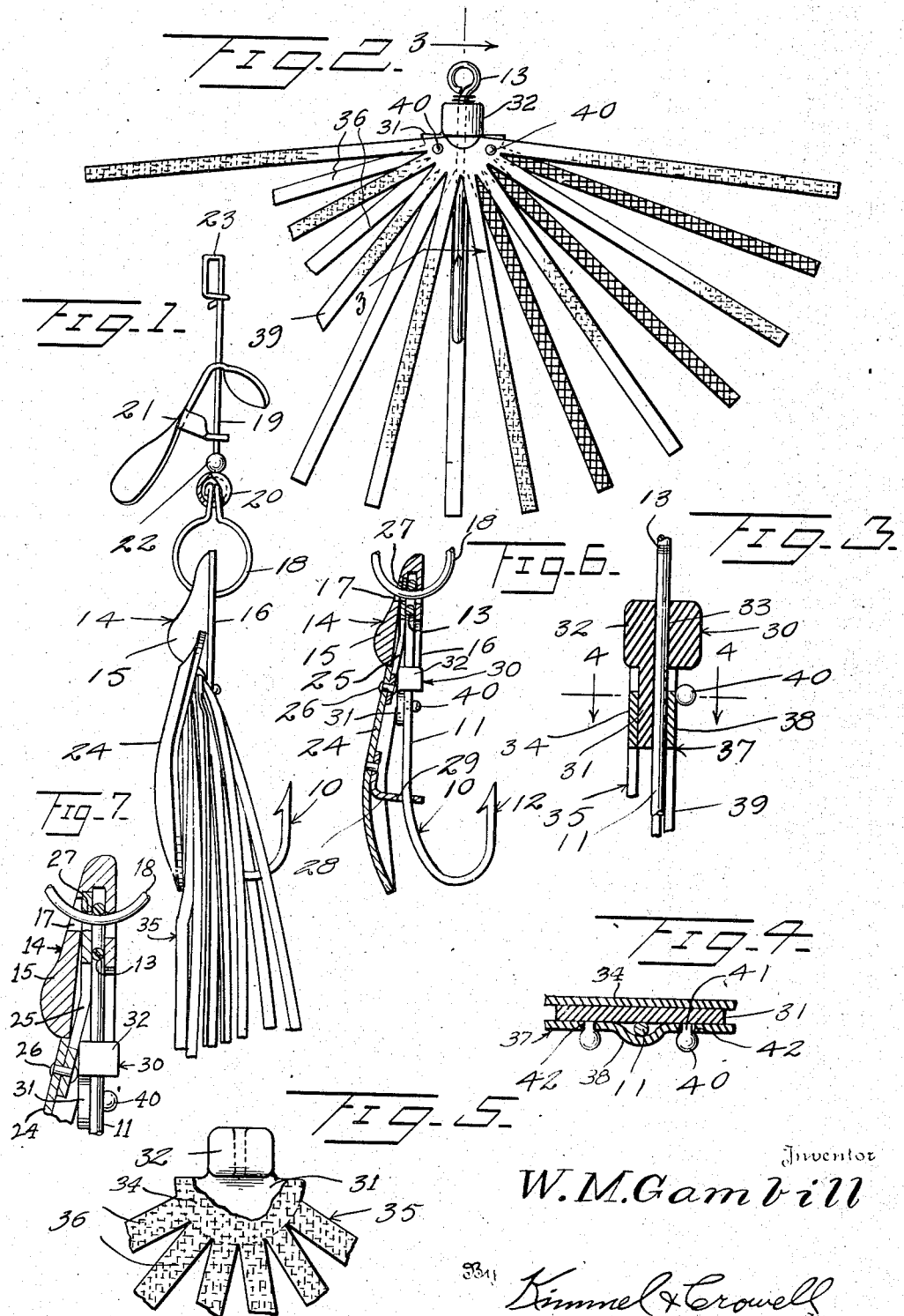
Inventor
W. M. Gambill
By Kimmel & Crowell
Attorney Patented Oct. 2, 1945

2,386,105

UNITED STATES PATENT OFFICE 2,386,105

FISH LURE

William Milton Gambill, Abilene, Tex.

Application May 27, 1943, Serial No. 488,718

10 Claims. (Cl. 43—48)

This invention relates to fish lures.

An object of this invention is to provide in combination a spinner, a bug simulating body and a rubber apron carried by the hook at one side of the body and adapted to substantially conceal the hook.

Another object of this invention is to provide an improved lure including a weighted bug simulating body and an improved means for detachably holding the hook and body to the weight.

A further object of this invention is to provide in a fish lure a rubber apron formed of a plurality of colored strips which may be readily applied to the hook, with one colored portion of the apron readily removable so that different color combinations may be used or a damaged part may be replaced.

A further object of this invention is to provide in a lure of this kind a rubber apron which is adapted to be mounted on the shank of the hook, the apron including a yieldable body part which resiliently grips the shank of the hook to maintain its position and which may under stress or strain shift lengthwise of the shank of the hook without damage.

Embodying the foregoing objects and others which may hereinafter appear, the invention consists of the novel construction, combination and arrangement of parts as will be more specifically referred to and illustrated in the accompanying drawing wherein is shown an embodiment of the invention, but it is to be understood that changes, variations and modifications may be resorted to which fall within the scope of the invention as claimed.

In the drawing:

Figure 1 is a detail side elevation of a fish lure constructed according to an embodiment of this invention, Figure 2 is a detail front elevation partly broken away of the rubber apron or hook concealing means, Figure 3 is a fragmentary sectional view taken on the line 3—3 of Figure 2, Figure 4 is a sectional view taken on the line 4—4 of Figure 3, Figure 5 is a fragmentary rear elevation of the apron and securing means therefor, and Figure 6 is a fragmentary longitudinal section of the lure body with the apron removed from the apron support or body.

Figure 7 is a fragmentary detail view of the upper part of the lure shown in Figure 6.

Referring to the drawing, the numeral 10 designates generally a hook which is formed with a shank 11, an eye 13 at the upper end of the shank and a bill 12. The hook is adapted to have the upper portion of the shank 11 including the eye 13 disposed within a weighted member 14. The weight member 14 includes a weight body 15 and a flat plate 16 structurally integral with one side of the body 15. The body 15 of the weight is shaped to simulate the head of a bug and may be colored or otherwise decorated on the outer surface thereof to simulate the desired bug. The weight or body 14 is provided with an opening 17 therethrough through which a split loop 18 is adapted to engage.

The loop 18 also engages through the eye 13 of the hook which eye is interposed between the body 15 and the rear plate 16. The split loop 18 is secured to an elongated wire leader or shaft 19 and is held in closed position by means of a clamping or holding ball 20. A spinner 21 of conventional construction is rotatably mounted on the shaft or leader 19 and rotatably engages at its lower portion on a ball or bead 22 which is mounted on the shaft or leader 19. The upper end of the shaft or leader 19 is formed with an eye 23 for attachment to one end of the fish line.

The insect of which the head 14 is a part also includes a concavo-convex plate 24. The plate 24 has the convex side thereof outermost and the concave side innermost and has secured thereto a narrow strip 25 by means of one or more fastening devices 26. The strip 25 is adapted to extend upwardly into the head or weight member 14 and is formed with an opening 27 through which the split eye or loop 18 is adapted to engage. In this manner the split loop or eye 18 holds the bug in assembled condition.

The inner concave side of the plate 24 has secured thereto a substantially right angular hook holding or guide member 28. The guide member 28 is formed with an opening 29 inwardly from the inner concave side of the plate 24 through which the shank 11 of the hook is adapted to loosely engage. The substantially right angular guide member 28 is adapted to hold the hook 10 in spaced relation to the plate.

The hook 10 has mounted thereon a rubber apron structure, generally designated as 30 (see Fig. 3). This apron structure 30 includes a flat body 31 which is adapted to bear against the inner side of the shank 11 between the shank and the inner concave side of the plate 24. The body 31 has formed integral therewith a round boss 32 which is formed with an opening 33 through which the shank 11 of the hook is adapted to frictionally engage. The apron body 31 has secured to the inner side thereof the body portion 34 of a rubber apron 35. The member 34 is secured to the body 31 in the same manner as is the apron 37, presently to be described. The body 34 of the apron has formed integral therewith a plurality of narrow elongated rubber strips 36.

In practice the body 34 of the apron 35 with the strips 36 are cut on substantially a semicircle, as shown in Figure 2 with respect to the apron 37, presently to be described, so that the strips 36 will inherently assume a spread position. The body 31 has secured to the forward side thereof a second apron structure 37. The apron structure 37 includes a body 38 and a plurality of substantially radially arranged narrow flat strips 39, similar to strips 36. The holding body 31 is formed on the forward side thereof with a pair of forwardly projecting balls 40 which are spaced from the adjacent side of the body 31 by narrow shanks 41. The body 38 of the apron 37 is formed with a pair of holes 42 so that the body 38 may be detachably secured to the body 31. The body 38 as shown in Figure 4 is adapted to straddle the shank 11 of the hook and coacts with the boss 32 in resiliently holding the apron structure against rotation and lengthwise movement with respect to the shank of the hook (see Fig. 1).

In the present instance, the strips 39 are of a different color than the strips 36, the latter being black and the strips 39 being yellow. It will, of course, be understood that any desired color combinations may be used depending upon the type of bug which is to be simulated.

The lure hereinbefore described being constructed preferably of metal and rubber or other suitable non-absorbent material will not be affected by water, and the rubber apron structure will readily assume the desired positions when in the water or when drawn through the water.

What I claim is:

1. A fish lure comprising a hook formed with a shank, a bill and an eye, a bug simulating element, means detachably securing said element to said hook, a yieldable member mounted on said shank, said member including a flared body, a boss integral with said body and formed with an opening through which said shank engages, an apron fixed to one side of said body, a second apron on the opposite side of said body, and means detachably securing said second apron on said body.

2. A fish lure comprising a hook formed with a shank, a bill and an eye, a bug simulating element, means detachably securing said element to said hook, a yieldable member mounted on said shank, said member including a flared body, a boss integral with said body and formed with an opening through which said shank engages, an apron fixed to one side of said body, a second apron on the opposite side of said body, and a pair of headed members carried by said body for detachably holding said second apron on said body.

3. A fish lure comprising a hook formed with a shank, a bill and an eye, a bug simulating element, means detachably securing said element to said hook, a yieldable member mounted on said shank, said member including a flared body, a boss integral with said body and formed with an opening through which said shank engages, an apron fixed to one side of said body, a second apron on the opposite side of said body, each apron formed with a solid upper part and a plurality of integral depending narrow strips carried by said upper part, and means detachably securing said second apron on said body.

4. A fish lure comprising a hook formed with a shank, a bill and an eye, a bug simulating element, means detachably securing said element to said hook, a yieldable member mounted on said shank, said member including a flared body, a boss integral with said body and formed with an opening through which said shank engages, an apron fixed to one side of said body, a second apron on the opposite side of said body, each apron formed of rubber and including a solid upper part and a plurality of integral depending yieldable narrow strips carried by said upper part, and means detachably securing said second apron on said body.

5. A fish lure comprising a bug simulating member formed of a weighted head and a concavo-convex body part, said head having a recess and a transverse opening intersecting said opening, an elongated narrow strip secured to said body part and extending into said recess, said strip having an opening adapted to align with the opening in said head, a hook formed of a shank, an eye at one end of the shank and a bill at the other end of the shank, said eye also engaging in said opening of said head, a guide for said shank carried by the concave side of said body part, a shaft formed with a split loop at its lower end, said loop engaging through the opening of said head, the eye of said hook and the opening of said strip to thereby hold said elements in assembled position.

6. A fish lure comprising a bug simulating member formed of a weighted head and a concavo-convex body part, said head having a recess and a transverse opening intersecting said opening, an elongated narrow strip secured to said body part and extending into said recess, said strip having an opening adapted to align with the opening in said head, a hook formed of a shank, an eye at one end of the shank and a bill at the other end of the shank, said eye also engaging in said opening of said head, a guide for said shank carried by the concave side of said body part, a shaft formed with a split loop at its lower end, said loop engaging through the opening of said head, the eye of said hook and the opening of said strip to thereby hold said elements in assembled position, a spinner rotatably carried by said shaft, and a flexible hook concealing means mounted on said shank.

7. A fish lure comprising a bug simulating member formed of a weighted head and a concavo-convex body part, said head having a recess and a transverse opening intersecting said opening, an elongated narrow strip secured to said body part and extending into said recess, said strip having an opening adapted to align with the opening in said head, a hook formed of a shank, an eye at one end of the shank and a bill at the other end of the shank, said eye also engaging in said opening of said head, a guide for said shank carried by the concave side of said body part, a shaft formed with a split loop at its lower end, said loop engaging through the opening of said head, the eye of said hook and the opening of said strip to thereby hold said elements in assembled position, and a flexible hook concealing means mounted on said shank, said concealing means comprising a plurality of elongated elastic strips, and means securing said strips on said shank.

8. A device of the kind described including a sinker in the form of a bug head, a concavo-convex extension therefrom simulating the body of a bug, said head having a recess therein to receive a shank and eye of a fish hook, means for holding said head and hook member together, and flaring means simulating the legs of a bug attached to the inner side of said extension.

9. A device of the kind described including a sinker in the form of a bug head, a concavo-convex extension therefrom simulating the body of a bug, said head having a recess therein to receive a shank and eye of a fish hook, means for holding said head and hook member together and flaring means simulating the legs of a bug attached to the inner side of said extension, and an apron structure attached to the shank of said hook to which said last members are secured.

10. A device of the kind described including a sinker in the form of a bug head, a concavo-convex extension therefrom simulating the body of a bug, said head having a recess therein to receive a shank and eye of a fish hook, means for holding said head and hook member together and flaring means simulating the legs of a bug attached to the inner side of said extension, and an apron structure attached to the shank of said hook to which said last members are secured, said leg simulating members being detachably connected to said apron.

WILLIAM MILTON GAMBILL.